United States Patent [19]

Hoyano et al.

[11] Patent Number: 5,371,152

[45] Date of Patent: Dec. 6, 1994

[54] RESIN COMPOSITION AND PROCESS FOR PRODUCING THE COMPOSITION

[75] Inventors: Masashi Hoyano; Masato Andoh, both of Shizuoka, Japan

[73] Assignee: Toho Rayon Co., Ltd., Tokyo, Japan

[21] Appl. No.: 957,799

[22] Filed: Oct. 8, 1992

Related U.S. Application Data

[63] Continuation-in-part of Ser. No. 813,923, Dec. 27, 1991, abandoned.

[30] Foreign Application Priority Data

Dec. 28, 1990 [JP] Japan ................... 2-418865

[51] Int. Cl.$^5$ .............................................. C08L 63/00
[52] U.S. Cl. ...................... 525/423; 525/396; 525/438; 525/463; 525/510; 525/522; 525/523; 525/533; 525/535; 525/906
[58] Field of Search .............. 525/423, 510, 522, 396, 525/438, 523, 533, 535, 463, 906

[56] References Cited

U.S. PATENT DOCUMENTS

| | | | |
|---|---|---|---|
| 4,608,404 | 8/1986 | Gardner et al. | 525/423 |
| 4,661,559 | 4/1987 | Gardner et al. | 525/523 |
| 4,663,401 | 5/1987 | Saito et al. | 525/523 |
| 4,808,639 | 2/1989 | Chernack | 525/113 |
| 5,026,789 | 6/1991 | Weber et al. | 525/423 |
| 5,151,471 | 9/1992 | Qureshi et al. | 525/423 |

FOREIGN PATENT DOCUMENTS

| | | |
|---|---|---|
| 716638 | 8/1965 | Canada . |
| 0392348 | 10/1990 | European Pat. Off. . |

OTHER PUBLICATIONS

Derwent Abstract of JP48019545, Dec. 22, 1970.

*Primary Examiner*—John C. Bleutge
*Assistant Examiner*—Randy Galakowski
*Attorney, Agent, or Firm*—Sughrue, Mion, Zinn, Macpeak & Seas

[57] ABSTRACT

The resin composition comprises, as essential components, (A) an epoxy resin, (B) a thermoplastic resin and (C) particles of a diaminodiphenylsulfone compound whose cross linking reactivity with the epoxy resin is prevented until the resin composition is subjected to molding or curing by a resin coating which is formed (i) by forming or adhering resin particles onto the surface of the diaminodiphenylsulfone particles or (ii) by forming a resin film on the diaminodiphenylsulfone particles, the coating resin used for forming the resin coating is not compatible with components included in the resin composition at the temperature up to the curing temperature of the resin composition.

12 Claims, No Drawings

RESIN COMPOSITION AND PROCESS FOR PRODUCING THE COMPOSITION

This is a continuation-in-part of application Ser. No. 07/813,923 filed on Dec. 27, 1991, now abandoned.

FIELD OF THE INVENTION

The present invention relates to a resin composition having a prolonged shelf-life which is capable of providing a cured product having good thermal resistance and especially good impact strength, and also relates to a process for the production of the composition. More particularly, the present invention relates to a resin composition which gives a molded product having the excellent mechanical and thermal characteristics inherent to an epoxy resin especially and the excellent toughness inherent to a thermoplastic resin.

BACKGROUND OF THE INVENTION

Recently, composites in which carbon fibers, aromatic polyamide fibers or the like are used as reinforcement have been frequently used as structural materials for aircraft and the like, based on their high specific strength and high specific rigidity.

Composites which have excellent thermal resistance, mechanical characteristics, dimensional stability, chemical resistance and weather resistance have been provided by combining aromatic glycidylamine epoxy resins as the matrix resin with a diaminodiphenylsulfone as a curing agent.

Though such composites prepared from epoxy resin-based prepregs show good performance, it has been found that they have inferior toughness and impact strength because of the short shelf-life of the prepreg and the low elongation and, therefore, brittleness of the matrix resin.

Especially, an improvement of the impact strength of the composite without reducing the thermal resistance thereof has been regarded as an important object in the case of the use of such composites as primary structural materials in aircraft which are apt to receive impact from the outside, for instance, by pebbles bounced up at the time of take-off or landing, from tools dropped by mistake during maintenance and repair and the like.

In order to increase the high impact strength of a composite, it is important not only to improve the elongation of a reinforcement such as carbon fibers but also to increase the toughness of a matrix resin. For this reason, a number of attempts have been made to improve matrix resins.

In order to improve the toughness of matrix resins, several methods have been proposed such as a method in which an epoxy resin is mixed with a rubber component and a method in which an epoxy resin is mixed with a high molecular weight component. When an epoxy resin is mixed with a rubber component, the toughness and impact strength of the resulting molded product can be improved, but its thermal resistance and mechanical characteristics are reduced. Because of this, the mixing ratio of the rubber component is limited, sometimes to a low mixing ratio depending on the use of the product, thus resulting in insufficient improvement.

In order to mix an epoxy resin with a thermoplastic resin as a high molecular weight component, a thermoplastic resin is dissolved in the epoxy resin at high temperature, or a thermoplastic resin is dissolved in a solvent and then the epoxy resin is added to the solution. When a thermoplastic resin is dissolved in an epoxy resin at a high temperature, the viscosity of the resin mixture increases and, at the same time, its tackiness decreases, thus resulting in markedly poor handling ability. Mixing of these resins using a solvent also has disadvantages such as the problem of removing the solvent after mixing, complex preparation steps and a decrease in thermal resistance due to a small amount of remaining solvent.

As a consequence, conventional resin compositions prepared by mixing an epoxy resin with a small amount of a rubber component or a high molecular weight component provide a composite with a poor impact strength-improving effect though the decrease in thermal resistance is not so great.

Other types of resin compositions used as prepregs have been disclosed, for instance, in JP-A-61-250021, JP-A-62-57417 and JP-A-63-162732 (corresponding to U.S. Pat. No. 5,028,478), in which a thermoplastic resin is dispersed in and mixed with an epoxy resin to improve toughness (impact strength) of a composite, but with insufficient effect in terms of impact strength of the composite. (The term "JP-A" as used herein means an "unexamined published Japanese Patent Application".)

In addition, in these resin compositions, a diaminodiphenylsulfone compound is used as an epoxy resin-curing agent in view of the thermal resistance of the resulting composite. When such a compound is used as a curing agent, the resulting resin composition has a short shelf-Life of about 2 to 3 weeks at room temperature (about 23° C.), thus resulting in a handling problem.

Accordingly, this invention contemplates overcoming the above-mentioned problems involved in the prior art.

SUMMARY OF THE INVENTION

The first object of the present invention is to provide a resin composition which has a prolonged shelf-life and is capable of providing a composite having excellent thermal resistance and excellent mechanical characteristics, especially impact strength, and to provide a process for the production of such a composition.

The second object of the present invention is to provide a mixed type resin composition having advantages inherent to an epoxy resin and especially a thermoplastic resin and to provide a process for the production of such a composition.

The third object of the present invention is to provide a resin composition suitably used as a prepreg and to provide a process for the production of such a composition.

The resin composition of the present invention comprises, as resin components, (A) an epoxy resin, (B) a thermoplastic resin, and (C) particles of a diaminodiphenylsulfone compound whose cross linking reactivity with the epoxy resin is prevented until the resin composition is subjected to molding or curing by a resin coating which is formed (i) by forming or adhering resin particles onto the surface of the diaminodiphenylsulfone particles or (ii) by forming a resin film on the diaminodiphenylsulfone particles. The resin which is used for forming the resin coating should be selected from resins which are not compatible with components included in the resin composition at the temperature up to the curing temperature of resin composition.

The resin composition of the present invention can be obtained by a method which comprises mixing (A) an epoxy resin (B) a thermoplastic resin, and (C) particles of a diaminodiphenylsulfone compound whose cross linking reactivity with the epoxy resin is prevented until the resin composition is subjected to molding or curing by a resin coating which is formed (i) by forming or adhering resin particles onto the surface of the diaminodiphenylsulfone particles or (ii) by forming a resin film on the diaminodiphenylsulfone particles. The resin which is used for forming the resin coating should be selected from resins which are not compatible with components included in the resin composition at a temperature up to the curing temperature of resin composition.

Other objects and advantages of the present invention will be made apparent as the description progresses.

In the present invention the curing temperature and

DETAILED DESCRIPTION OF THE INVENTION

Examples of an epoxy resin which can be used as component (A) in the present invention include glycidylamine epoxy resins, bisphenol epoxy resins, novolak epoxy resins, urethane-modified bisphenol A epoxy resins, alicyclic epoxy resins, two or more of them and the like. The combined use of these resins with a diaminodiphenylsulfone compound as a curing agent makes possible the formation of a molded product having high thermal resistance and excellent mechanical characteristics.

Specific examples of each type of epoxy resins are recited below:

(1) Glycidylamine Epoxy Resin

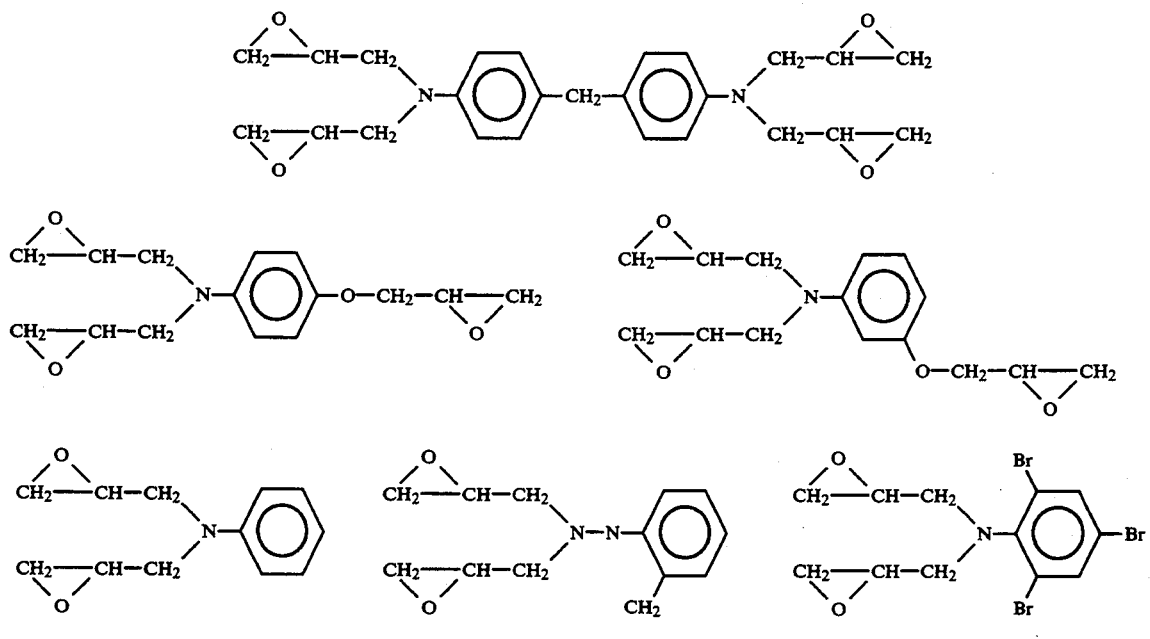

(2) Bisphenol Epoxy Resin

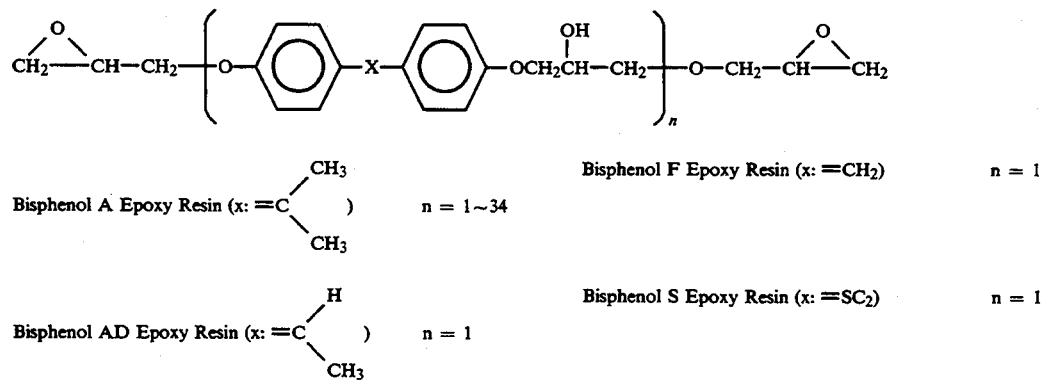

the molding temperature are substantially the same as each other.

(3) Novolak Epoxy Resin i) Phenol Novolak Epoxy Resin

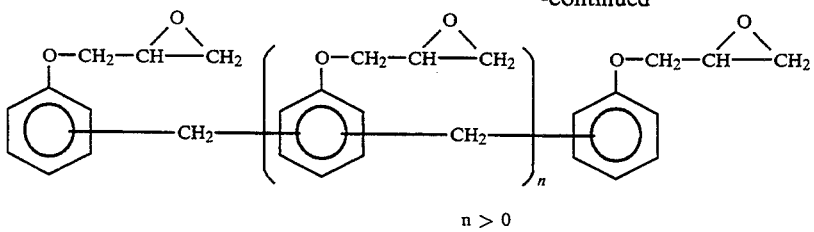

ii) Cresol Novolak Epoxy Resin

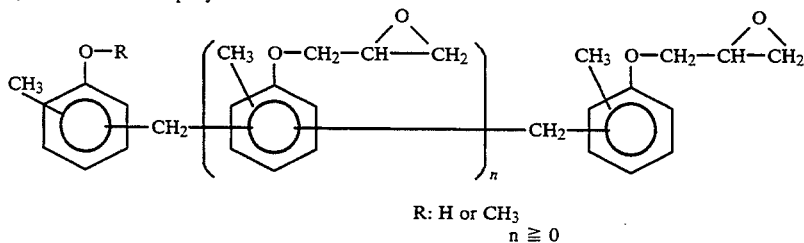

R: H or CH₃
$n \geqq 0$ (4) Urethane Modified Epoxy Resin
Bisphenol A epoxy resin modified with urethane at both ends thereof.

| (5) Aliphatic Epoxy Resin | Epoxy Equivalent (gr/mol epoxy) | Viscosity | Tradename of Product Produced by | |
|---|---|---|---|---|
| | | | CIBA-GEIGY | U.C.C. |
| Alicyclic diepoxy acetal | 133–154 | 125,000–200,000 | CY175 | ERL4234 |
| Alicyclic diepoxy adipate | 190–210 | 550–750 | CY177 | ERL4299 |
| Alicyclic diepoxy carboxylate | 131–143 | 350–450 | CY179 | ERL4221 |
| Vinyl cyclohexene dioxide | 70–74 | <15 | — | ERL4206 |

Commercially available epoxy resins are shown below:

Examples of glycidylamine epoxy resins include MY-720 (Ciba-Geigy Ltd.), Epotohto YH 434 (Tohto Kasei Co., Ltd.), Ep. 604 (Yuka Shell Co., Ltd.), ELM-120 (Sumitomo Chemical Co., Ltd.), ELM-100 (Sumitomo Chemical Co., Ltd.), GAN (Nippon Kayaku Co., Ltd.) and the like.

Examples of Disphenol epoxy resins include Epikote 815, Epikote 828, Epikote 834, Epikote 1001 and Epikote 807 (Yuka Shell Co., Ltd.), Epomic R-170 (Mitsui Petrochemical Industries, Ltd.), EXA 1514 (Dainippon ink & Chemicals, Inc.) and the like.

Examples of novolak epoxy resins include phenol novolak epoxy resins such as Epikote 152 and Epikote 154 (Yuka Shell Co., Ltd.), Dow Chemical DEN 431, DEN 485 and DEN 438 (Dow Chemical Co.), Epiclon N 740 (Dainippon Ink & Chemicals, Inc.) and the like, and cresol novolak epoxy resins such as Araldite ECN 1235, ECN 1273 and ECN 1280 (Ciba-Geigy Ltd.), EOCN 102, EOCN 103 and EOCN 104 (Nippon Kayaku Co., Ltd.) and the like.

Alicyclic epoxy resins such as Araldite CY-179, CY-178, CY-L82 and CY-183 (Ciba-Geigy Ltd.) and the like are also useful.

As urethane-modified bisphenol A epoxy resins, Adeka Resin EPU-6 and EPU-4 (Asahi Denka Kogyo K. K.) and the like are commercially available. When these resins are used, a resin composition having excellent flexibility and good adhesion to reinforcing fibers can be obtained. In addition, since these resins have the function of creating a heterogeneous structure of the resin due to their poor compatibility to the thermoplastic resin, they can contribute to the improvement of impact strength.

A reactive diluent may also be incorporated into the resin composition of the present invention as a part of component (A), if desired. The amount of the diluent is preferably not more than 10% by weight based on the weight of component (A).

Examples of the diluent include polypropylene diglycol diglycidyl ether, phenylglycidyl ether or the like. Epikote 871 or Epikote 872 (dimer acid modified epoxy resin; Yuka Shell Co., Ltd.), TACTIX 695 (a mixture comprising bisphenol A and brominated bisphenol A; Dow Chemical Co.) or the like may also be added as a flexible epoxy resin. Also useful as an additive is a heat resistant epoxy resin such as Epikote 1031 (tetra-functional epoxy resin) or Epikote 1032 (hepta-functional epoxy resin) (Yuka Shell Co., Ltd.), TACTIX 742 (trifunctional epoxy resin; Dow Chemical Co.) or the like.

Typical examples of the thermoplastic resin as component (B) in the present invention include polyether imide, polyether sulfone, polysulfone, polycarbonate, polyetherether ketone, polyamide, and the like, of which polyether imide, polyether sulfone and polysulfone are particularly preferred because they are compatible with component (A), and they have excellent thermal resistance.

Specific examples of each type of thermoplastic resins are shown below:

(1) Polyether Imide

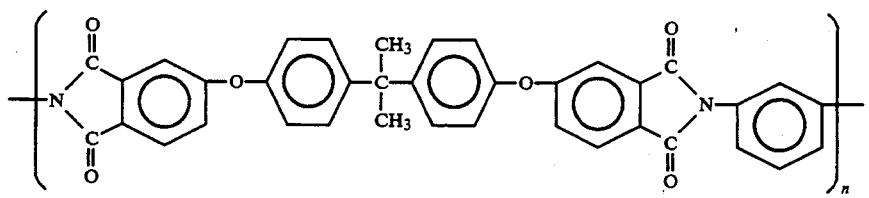

(2) Polyether Sulfone

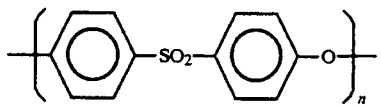

(3) Polysulfone

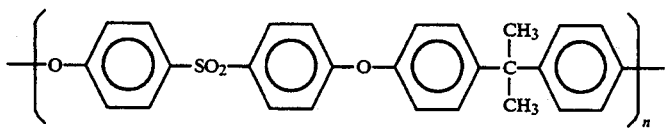

(4) Polycarbonate

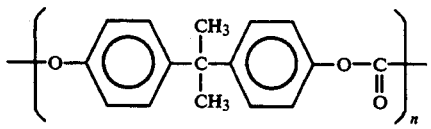

(e.g., n = 140)

(5) Polyetherether Ketone

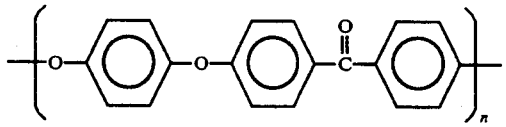

(6) Polyamide

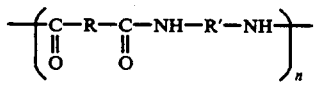

wherein R and R' each represents an alkylene or an arylene group, preferably having 1 to 12 and 6 to 12 carbon atoms, respectively.

These thermoplastic resins may be used alone or as a mixture of two or more of them, and these resins may be in a form of particles from the point of view of preparation of the resin composition of the present invention. A preferred size ranging from 1 to 50 μm, preferably from 1 to 20 μm.

Component (B) is preferably used in an amount of from 5 to 40 parts by weight, more preferably of from 15 to 35 parts by weight per 100 parts by weight of component (A).

Amounts of component (B) if larger than 40 parts by weight based on 100 parts by weight of an epoxy resin as component (A) usually tend to result in a high resin viscosity which leads to difficulty in attaining uniform mixing. Amounts of component (B) if smaller than 5 parts by weight tend to reduce toughness and, therefore, improvement in the impact strength also tends to decrease.

The diaminodiphenylsulfone compound (hereinafter abbreviated as DDS) used in the present invention can be represented by the following formula:

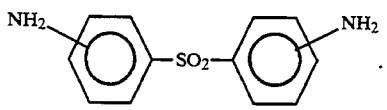

Examples of the DDS include 3,3'-diaminodiphenylsulfone, 3,4'-diaminodiphenyisulfone and 4,4'-diaminodiphenylsulfone. The DDS is used as fine particles having a size preferably of from 1 to 50 μm, and more preferably from 10 to 30 μm.

In the present invention, in order to prolong or extend the shelf-life of the composition which is a mixture of components (A), (B) and DDS or is in a form of prepreg thereof, the activity of the cross linking reactivity (or curing function) of the DDS is prevented or protected until the composition is subjected to molding or curing.

In the present invention DDS should be prevented from reacting with the epoxy resin tridimensionally to form a cured epoxy resin by cross linking. Proceeding of a unidimensional reaction (by which a tridimensional molecular structure as in the molecules of a cured epoxy resin does not form) of the DDS and the epoxy resin to form a linear compound is permitted.

Such desired effect can be attained by forming or adhering resin particles on the surface of each DDS particle. The resin particles may be formed or adhered to the surface separately from each other, may be formed or adhered to form a net-work structure, or may be form a layer on the surface of the DOS particle, which layer may be continuous or non-continuous, or porous or nonporous, so long as the molten DOS can flow out through the spaces among the resin particles, through the pores or through the non-continuous portion of the layer, and/or the DDS particles can be exposed due to melting or destruction of the covering comprising the resin particles, under the conditions (pressure and/or temperature) of molding or curing.

The resin composition of the present invention is one wherein the coating resin melts or is destroyed (i) at from 90° to 200° C., (ii) under a pressure of from 1 to 5 kgf/cm² or (iii) at from 90° to 200° C. and under a pressure of from 1 to 5 kgf/cm².

In the present invention DDS particles are coated with a resin which is not compatible with the epoxy resin (component A), the thermoplastic resin (component B), and other components in the resin composition at the temperature up to the curing temperature of the resin composition. The coating resin should remain in the resin composition without dissolving into the other components even if the coating resin melts upon heating the resin composition. The resin has less or no reactivity to epoxy resin.

The size of the resin particles is less than the size of the DOS particles. A preferred particle size of the resin [articles is from 1/3 to 1/100 of that of the DDS particles, and it is usually from 0.1 to 5 μm.

The molding of the composition is usually conducted at a temperature of from about 90° to 200° C. and a pressure of from about 1 to 5 kgf/cm². The curing temperature is usually from about 170° to 200° C. The resin which can be used for coating may be selected from those which melt or of which covering is destroyed at the molding temperature and/or under the molding pressure.

The resin used for the coating of the DDS particles is selected from thermoplastic resins or thermosetting resins. Illustrative examples of resins which can be used for coating in the present invention include polyamide resin, modified urea resin (the resin is cured after adhering the resin on the DDS particles), cured melamine resin, and the like.

Prefered combinations of components (A) and (B) and the resin which is used for coating the DDS particles are shown below.

|  |  |  | Compatibility | |
| --- | --- | --- | --- | --- |
| Component (A) (Epoxy resin) | Component (B) (Thermoplastic resin) | Coating resin | Component (B) to Component (A) | Coating resin* to Components (A) and (B) |
| All epoxy resins cited hereinabove as component (A) | All thermoplastic resins cited hereinabove as component (B) | Cured melamine resin | exist | none |
| All epoxy resins cited hereinabove as component (A) | Polyether imide | Nylon 12 | " | " |
| All epoxy resins cited hereinabove as component (A) | Polyether sulfone | " | " | " |
| All epoxy resins cited hereinabove as component (A) | Polysulfone | " | " | " |
| All epoxy resins cited hereinabove as component (A) | Polyether imide | Dimer acid-modified polyamide* | " | " |

*VERSAMID MACROMELT (trade name: manufactured by Henkel Co.)

The following combination can not be used in the present invention because the resin for coating DDS is compatible with component B.

| Component B | Resin for coating DDS |
| --- | --- |
| Nylon 6.6 | Nylon 12 |
| Nylon 6 | " |

| | |
|---|---|
| Component B | Resin for coating DDS |
| Nylon 6.6 | Dimer acid modified polyamide |

When the resin covering has a structure through which the molten DDS is able to flow out, the type of the resin can be selected from resins which do not melt or those of which the covering may not be destroyed under the above-described conditions.

These coating resins may be used alone or as a mixture of two or more of them. Alternatively, two or more types of DDS particles which are coated using different coating resins may be used in the resin composition of the present invention.

Adhesion of particles on the surface of the DDS particle can be carried out by conducting a solution polymerization in a liquid dispersion of the DDS particles so that polymer particles are formed on the surface of the DDS particles, or by curing a resin in a resin solution or emulsion wherein the DDS particles are dispersed to form cured resin particles on the surface of the DDS particles. The method which is disclosed in detail in JP-A-3-4932 and JP-A-3-238038 can be preferably used for production of component (C) of the present invention. In this method DDS particles and an amino compound/formaldelhyde primary polycondensation product are dispersed in an aqueous solution of a water soluble polymer to form an emulsion. By heating the emulsion while stirring the polycondensation reaction is proceeded to deposite the polycondensation product on the surface of the DDS particles as fine particles to coat the surface of the DDS surface. Further, adhesion of the resin particles or forming of a resin film on the surface of the DDS particles can be carried out by a dry method in which the DDS particles and the resin particles for adhering thereto or for forming film thereon are mixed using a high speed mixer or the like to adhere the particles of coating resin electrostatically on the surface of the DDS particles, and then the resin particles are firmly adhered on the surface of DDS particles by heat-melting the resin or the resin particles are made into a film form by heat-melting the resin. These methods may be selected properly depending on the properties of the coating resin and the particle size desired.

In order to gain good composite characteristics, it is desirable to coat the coating resin uniformly and thinly on the surface of the DDS particles. For this purpose, the coating resin may preferably be used in an amount ranging from 5 to 20% by weight, more preferably from 10 to 15% by weight based on the weight of the DDS particles.

Since reaction of the epoxy resin with the curing agent hardly or does not progress at room temperature, the resin composition of the present invention has a longer shelf-life (about twice) that of a resin composition in which DDS is used as a curing agent without coating it by a coating resin. When the resin composition of the present invention is subjected to molding or curing, the DDS compound starts to react with the epoxy resin when the temperature reaches about 170° C. or higher, thereby resulting in the formation of a cured product.

Other curing agents or curing accelerators may be added to the composition in such amounts that the shelf-life of the composition and the physical properties of the composite obtained therefrom are not altered by the addition of such agents. It is preferred that the amount of such agents or accelerator is not more than 10 parts by weight per 100 parts by weight of component (A).

Examples of such epoxy resin-curing agents include aromatic amines such as metaphenylenediamine, diaminodiphen-ylmethane and the like; acid anhydrides such as phthalic anhydride, trimellitic anhydride, pyromellitic anhydride and the like; boron trifluoride complex salts such as $BF_3$ monoethylamine, $BF_3$ benzylamine and the like; and imidazoles such as 2-ethyl-4-methyl imidazole, 2-ethyl imidazole, 2,4-dimethyl imidazole, 2-phenyl imidazole and the like. Urea compounds (3-[3,4-dichlorophenyl]-1,1-dimethyl urea and the like) and organic metal salts (Co(III) acetyl acetonate and the like) may also be used jointly.

The DDS as an epoxy resin-curing agent is used in an epoxy equivalent/amine equivalent ratio of 1/1 in theory but, taking the mechanical properties and the water absorption coefficiency of the resulting cured product into consideration, the DDS may be used generally within the equivalent ratio of 1/(0.6 to 1.3), preferably 1/(0.8 to 1).

In addition to the aforementioned essential components, the resin composition of the present invention may further contain rubber components (for example, a carboxyl-terminated butadiene/acrylonitrile copolymer, nitrile rubber, epoxy-modified polybutadiene rubber and the like) in small amounts so that the thermal resistance of the composition is not reduced and fillers (silica powder and the like for example) in such amounts that handling of the resulting prepreg does not worsen, as well as flame retardants such as antimony trioxide, coloring agents and the like. From a handling point of view, the resin composition of the present invention may also contain small amounts of a modified acrylic polymer (MODAFLOW manufactured by Monsanto Co., for example) as a flowability regulating agent and silicone resin, silicone oil, vaseline or the like as a water repellent. These substance are added in a total amount preferably of not more than 10 parts by weight per 100 parts by weight of component (A).

The resin composition of the present invention may be prepared, for instance, in accordance with the following illustrative procedure.

Each of the components is subjected to heat kneading using a kneading machine preferably in an inert gas atmosphere. The heating temperature in this instance is set to a level lower than the curing initiation temperature of the epoxy resin used. In general, the ingredients of component (A) are firstly mixed uniformly at a temperature of from 20° to 90° C. when component (A) comprises two or more epoxy resins, preferably from 40° to 90° C. Component (A) is mixed with components (B) and (C) to form a uniform mixture at a temperature of from 20° to 90° C. In this instance, component (B) may be used in a finely powdered form preferably having a particle size of from 1 to 50 μm, more preferably from 1 to 20 μm, so that component (B) can be dispersed uniformly and preparation of the resin composition can be carried out smoothly. In this manner, a resin composition can be prepared in which a thermoplastic resin component is blended to a high level of about 40 parts by weight per 100 parts by weight of the epoxy resin. However, blending of the thermoplastic resin component to a higher level than 40 parts by weight usually is not preferable because the viscosity of the composition becomes too high which leads to difficulty in kneading the components.

The resin composition of the present invention is suitable for use to produce a molded product, especially, containing fibers as reinforcement.

Examples of fiber reinforcement which are preferably used in the present invention include carbon fiber, glass fiber, aromatic polyamide fiber and the like, which may be used alone or in combination. For the purpose of improving the mechanical properties of a composite, it is preferable to use so-called "high strength medium modulus of elasticity carbon fibers" which have a tensile strength of 400 kgf/mm$^2$ or more and a modulus of elasticity of $30 \times 10^3$ kgf/mm$^2$ or more. The modulus of elasticity is preferably not more than $40 \times 10^3$ Kgf/mm$^2$.

The length of the carbon fiber usually is from 5 to 70 mm, or the carbon fiber may be continuous. The fiber reinforcement may be in the form of a textile, a unidirectional parallel yarn product, chopped fiber or the like. The fiber reinforcement generally has a diameter of from 1 to 20 μm, preferably from 5 to 7 μm. The preferable amount of the fiber reinforcement is from 5 to 70% by volume, and preferably from 55 to 65% by volume, based on the volume of the composition. Carbon fibers which are coated with a metal such as Ni, Al, Cu Zn, Pb, Su, Au, Ag may also be used in the present invention.

In the process of the present invention, a prepreg for production of a molding is generally prepared by impregnating the resin composition of the present invention into a fiber reinforcement, which preferably is effected by a conventional hot melt method. This method is carried out by preparing a resin composition film, placing fibers thereon, and hot-pressing the thus obtained assembly. This method is described more in detail, for example, in U.S. Pat. Nos. 4,714,648, 4,482,660, and 4,309,473.

The prepreg containing the fiber obtained by such a process has excellent qualities. The prepreg is subjected to molding and curing, usually using a hot-press method or an autoclave method. The hot-press method is usually conducted at a temperature of from about 90° to 200° C. and a pressure of from about 1 to 5 kgf/cm$^2$ for about 1 to 3 hours.

Since the resin composition of the present invention is preferably prepared by uniformly dispersing the component (B) thermoplastic resin in the component (A) epoxy resin, not only it is possible to prepare a prepreg by the conventional hot melt method, but also it is possible to prepare an excellent resin composition for a prepreg having a prolonged shelf life. The product obtained from the prepreg does not raise problems due to remaining solvent and has both the excellent thermal stability inherent to the epoxy resin and the toughness and impact strength inherent to the thermoplastic resin without decreasing the mechanical characteristics thereof.

Though the reason is not known, a composite having excellent toughness and impact strength can be obtained when DDS particles are coated and used as a curing agent of a resin composition comprising components (A) and (B). Such effects are superior to the case of a separate mixing of the DDS particles with the coating resin without coating it on the DDS particles.

Examples of the present invention are given below by way of illustration and not by way of limitation.

EXAMPLES 1 TO 6 AND COMPARATIVE EXAMPLE 1

Ingredients of the main component (A) which are shown in Table 1 were mixed uniformly at 60° C. for 5 minutes in mixing ratios which are also shown in Table 1. To component (A) were then added components (B) and (C), and the resulting mixture was stirred at 60° C. for 15 minutes using an agitator to obtain a resin composition for prepreg use. In this instance, each coating resin shown in Table 1 was used in an amount of 10% by weight based on the weight of diaminodiphenylsulfone used as the component (C).

Component (C) which was used in Examples 1 and 6 was prepared by the following method:

100 parts by weight of DDS particles having a size of from 10 to 30 μm and 10 parts by weight of Nylon 12 particles having a size of 1 μm were mixed in a high-speed mixer at a room temperature for 1 hour. The Nylon particles were adhered uniformly on the surface of the DDS particles electrostatically. The DDS particles having the Nylon 12 particles thereon were dispersed on a plastic sheet in such a manner that the DDS particles do not contact each other. Thus dispersed particles were placed in a thermostatic bath which was controlled to 170° C. and heated the particles for 30 minutes to melt and firmly adhere the Nylon 12 particles on the surface of the DDS particles.

Component (C) which was used in Examples 2 to 5 was prepared by the following method.

30 parts by weight of 3% by weight of an aqueous solution of a naphthalene sulfonic acid/formaldehyde condensation product and 120 parts by weight of 3% by weight of an aqueous solution of ethylene/maleic anhydride copolymer (average molecular weight: 80,000; as sodium salt) were mixed, and then DDS particles having particle sizes of 10 to 30 μm were dispersed into the mixture. The pH of the dispersion was adjusted to 5.0. Then the mixture was further subjected to mixing using a homomixer at 10,000 rpm.

A melamine/formaldehyde primary polycondensation was prepared using 20 parts by weight of 37% formalin and 8 parts by weight of melamine. The primary polycondensation product was added to the above-described dispersion. The thus obtained mixture was then subjected to proceed a polycondensation reaction at 60° C. for 3 hours while stirring at 250 rpm.

The pH of the thus obtained reaction mixture was adjusted to 4.0 and the reaction was further continued at 80° C. for 2 hours. Particles coated with cured melamine resin thus obtained were recovered by filtering and washed with isopropyl alcohol. After then the particles were dried by aft at 100° C. for 60 minutes to obtain component (C).

A resin film having a 30 μm thickness was prepared from the thus obtained resin composition using a film coater at 70° C. Carbon fibers (BESFIGHT IM-600 manufactured by Toho Rayon Co., Ltd.; tensile strength: 600 kgf/mm$^2$; modulus of elasticity: $30 \times 10^3$ kgf/mm$^2$; diameter: 5 μm) were arranged in one direction on the thus prepared resin film, and impregnation was effected continuously by hot-roller at 80° C. under a pressure of 1 kg/cm$^2$ and at a speed of 3 m/min. In this way, a unidirectional prepreg containing carbon fiber in an amount of 145 g/m$^2$ and a resin content of 34% by weight was obtained.

A predetermined number of sheets were cut out from the thus obtained prepreg immediately after production thereof, 32 sheets or 8 sheets were laminated to one another and then subjected to autoclave molding at 180° C. under 5 kg/cm² for 2 hours to obtain a heat-cured molded plate. Thereafter, test pieces were cut out from the molded plate in order to measure the glass transition temperature thereof, compressive strength after 1500 in-lb/in impact (using the test piece compound of 32 sheets of prepreg), 0° compressive strength (compression strength in the same direction as that of the fibers—using the 8 sheets prepreg) under moist and warm conditions (tested at 82° C. after immersing the test piece in warm water of 71° C. for 2 weeks), and the gel time (at 180° C.) of the prepreg just after its preparation and after 2 months of storage at room temperature. The results are shown in Table 1.

In Comparative Example 1, a prepreg was prepared and its molded product was checked for its physical properties in the same manner as described above, except that component (B) was not used, with the results also shown in Table 1.

COMPARATIVE EXAMPLES 2 TO 4

Unidirectional prepregs were prepared and their properties were checked in the same manner as described above, except that 4,4'-diaminodiphenylsulfone which was not coated with a coating resin was used as the component (C). The results are shown in Table 1.

COMPARATIVE EXAMPLE 5

A unidirectional prepreg was prepared and its properties were checked in the same manner as described above, except that 4,4'-diaminodiphenylsulfone which was not coated with a coating resin was used as component (C) and a cured melamine resin was also used in the resin composition by uniformly dispersing thereto. The results are shown in Table 1.

TABLE 1

|  | Example |  |  |  |  |  | Comparative Example |  |  |  |  |
|---|---|---|---|---|---|---|---|---|---|---|---|
|  | 1 | 2 | 3 | 4 | 5 | 6 | 1 | 2 | 3 | 4 | 5 |
| Mixing ratio | | | | | | | | | | | |
| Component (A) | | | | | | | | | | | |
| Araldite MY-720 | 50 | 50 | 50 | 50 | 65 | 50 | 50 | 50 | 50 | 50 | 50 |
| Epikote 828 | 30 | 30 | 30 | 30 | 25 | 30 | 30 | 30 | 30 | 30 | 30 |
| Epikote 1001 | — | — | — | — | — | — | 20 | 20 | — | — | — |
| Urethane modified bisphenol A resin | 20 | 20 | 20 | 20 | 10 | 20 | — | — | 20 | 20 | 20 |
| Component (B) | | | | | | | | | | | |
| Polyetherimide | 30 | 30 | 15 | 20 | 30 | 30 | — | 30 | 30 | 15 | 30 |
| Polyethersulfone | — | — | 15 | — | — | — | — | — | — | 15 | — |
| Nylon 12 | — | — | — | 10 | — | — | — | — | — | — | — |
| Component (C) | | | | | | | | | | | |
| 4,4'-Diaminodiphenyl sulfone (coated with nylon 12) | 35 | — | — | — | — | 15 | — | — | — | — | — |
| 4,4'-Diaminodiphenyl sulfone (coated with melamine) | — | 35 | 30 | 35 | 35 | 20 | 35 | — | — | — | — |
| 4,4'-Diaminodiphenylsulfone | — | — | — | — | — | — | — | 32 | 32 | 27 | 32 |
| Dichlorophenyldimethyl urea | — | — | 1 | — | — | — | — | — | — | 1 | — |
| Melamine resin | — | — | — | — | — | — | — | — | — | — | 3 |
| Physical properties | | | | | | | | | | | |
| Glass transition temp. °C., by DSC*¹ | 179 | 188 | 185 | 170 | 200 | 181 | 180 | 181 | 188 | 185 | 186 |
| Compressive strength after impact*² | 33 | 38 | 34 | 35 | 32 | 35 | 12 | 19 | 30 | 28 | 30 |
| 0° Compressive strength*³ | 130 | 125 | 128 | 110 | 135 | 123 | 126 | 124 | 130 | 124 | 126 |
| Gel time*⁴ (min) | 18 | 15 | 10 | 17 | 19 | 16 | 16 | 16 | 17 | 10 | 15 |
| Gel time*⁵ (min) | 17 | 13 | 6 | 15 | 16 | 15 | 15 | 3 | 3 | 2 | 2 |

Note (1):
*¹; Differential Scanning Calorimeter
*²; Tested after 1500 in-lb/in impact using 32 ply pseudo-isotopic laminated sheet (kgf/mm²).
*³; Tested at 82° C. after immersion in 71° C. hot water for 2 weeks (kgf/mm²).
*⁴; Measured at 180° C. just after prepreg preparation.
*⁵; Measured at 180° C. after 2 months of storage at room temperature.
Note (2):
Mixing ratios in Table 1 are expressed by weight parts.

On the basis of these results, it was confirmed that the prepregs obtained in Examples 1 to 6 had longer shelf-life and the resulting composites had excellent thermal and mechanical characteristics and impact strength, as well as their longer shelf-life, in comparison with those obtained in the Comparative Examples.

Substantially the same results with respect to compressive strength after impact and 0° C. compressive strength as Examples 1 to 6 were obtained when the molding was conducted after storing the prepregs at room temperature for 8 weeks.

COMPARATIVE EXAMPLES 6 AND 7

Unidirectional prepregs were prepared in the same manner as in Example 1 except that any component (B) was not used and components (A) and (C) were changed as shown in Table 2. Properties of these prepregs were measured in the same manner as in Example 1 and the results are shown in Table 2.

It can be seen in Table 2 that when a thermoplastic resin as component (B) was not used, the effects of the present invention with respect to improvement of mechanical properties can not be obtained.

COMPARATIVE EXAMPLE 8

A unidirectional prepreg was prepared in the same manner as in Example 1 except that components (A), (B) and (C) were changed as shown in Table 2. In this prepreg the DDS particles were coated with a resin (Nylon 12) which is compatible with component (B) (Nylon 12).

It can be seen in Table 2 that when the resin used for coating the DDS particles is compatible with component (B), improvement in impact strength is not sufficient.

TABLE 2

|  | Comparative Example | | |
|---|---|---|---|
|  | 6 | 7 | 8 |
| Mixing ratio |  |  |  |
| Component (A) |  |  |  |
| Araldite MY-720 | 50 | 50 | 50 |
| Epikote 828 (MW: about 380) | — | — | 30 |
| Epikote 1001 (MW: about 900) | 30 | 30 | — |
| Urethane modified bisphenol A resin | 20 | 20 | 20 |
| Component (B) |  |  |  |
| Polyetherimide | — | — | 20 |
| Polyethersulfone | — | — | — |
| Nylon 12 | — | — | 10 |
| Component (C) |  |  |  |
| 4,4'-Diaminodiphenyl sulfone (coated with nylon 12) | — | — | 35 |
| 4,4'-Diaminodiphenyl sulfone (coated with melamine) | 35 | — | — |
| 4,4'-Diaminodiphenylsulfone | — | 32 | — |
| Dichlorophenyldimethyl urea | — | — | — |
| Melamine resin | — | — | — |
| Physical properties |  |  |  |
| Glass transition temp. °C., by DSC*[1] | 175 | 178 | 170 |
| Compressive strength after impact*[2] | 13 | 12 | 28 |
| 0° Compressive strength*[3] | 121 | 125 | 110 |
| Gel time*[4] (min) | 15 | 16 | 17 |
| Gel time*[5] (min) | 14 | 2 | 16 |

The resin composition of the present invention is capable of supplying a composite with excellent impact strength without deteriorating other mechanical characteristics, including thermal resistance, and it has an extended shelf-life in spite of the use of a diaminodiphenylsulfone as a curing agent.

Although some preferred embodiments have been described, many modifications and variations may be made thereto in the light of the above teachings. It is therefore to be understood that within the scope of the appended claims, the invention may be practiced otherwise than as specifically described.

While the invention has been described in detail and with reference to specific embodiments thereof, it will be apparent to one skilled in the art that various changes and modifications can be made therein without departing from the spirit and scope thereof.

What is claimed is:

1. A resin composition which comprises (A) an epoxy resin, (B) a thermoplastic resin selected from the group consisting of polyether imide, polyether sulfone, polysulfone, polycarbonate, polyetherether ketone, polyamide, and a mixture of two or more of them in an amount of from 5 to 40 parts by weight per 100 parts by weight of Component (A), and (C) particles of a diaminodiphenylsulfone compound whose cross linking reactivity with the epoxy resin is prevented until the resin composition is subjected to molding or curing by a resin coating which is formed (i) by forming or adhering resin particles onto the surface of the diaminodiphenylsulfone particles or (ii) by forming a resin film on the diaminodiphenylsulfone particles, the coating resin used for forming the resin coating is not compatible with components included in the resin composition at a temperature up to the curing temperature of the resin composition, wherein the coating resin is a polyamide or a cured melamine-formaldehyde resin wherein the diaminodiphenylsulfone compound is used in an epoxy equivalent/amine equivalent ratio of 1/(0.6 to 1.3), and wherein the amount of the coating resin is from 5 to 20% by weight based on the weight of the diaminodiphenylsulfone compound.

2. The resin composition as claimed in claim 1, wherein said resin particles are formed or adhered onto the diaminodiphenylsulfone particles i) separately from each other, ii) to form a network structure, or iii) to form continuous, noncontinuous, porous or non-porous layer.

3. The resin composition as claimed in claim 1, wherein the epoxy resin is selected from the group consisting of glycidylamine epoxy resins, bisphenol epoxy resins, novolak epoxy resins, urethane-modified bisphenol A epoxy resins, alicyclic epoxy resins, and a mixture of two or more of them.

4. The resin composition as claimed in claim 1, wherein the diaminodiphenylsulfone compound is selected from the group consisting of 3,3'-diaminodiphenyl sulfone, 3,4'-diaminodiphenyl sulfone and 4,4'-diaminodiphenyl sulfone.

5. The resin composition as claimed in claim 1, wherein the coating resin melts or is destroyed (i) at from 90° to 200° C., (ii) under a pressure of from 1 to 5 kgf/cm$^2$, or (iii) at from 90° to 200° C. and under pressure of from 1 to 5 kgf/cm$^2$.

6. The resin composition as claimed in claim 1, wherein the diaminodiphenylsulfone compound particle has a size of from 1 to 50 μm.

7. The resin composition as claimed in claim 1, wherein the composition contains a fiber reinforcement.

8. The resin composition as claimed in claim 7, wherein the fiber reinforcement is selected from the group consisting of carbon fiber, glass fiber and aromatic polyamide fiber.

9. The resin composition as claimed in claim 7, wherein the amount of the fiber reinforcement is from 5 to 70% by volume based on the volume of the composition.

10. A method for production of a resin composition which comprises (A) an epoxy resin, (B) a thermoplastic resin selected from the group consisting of polyether imide, polyether sulfone, polysulfone, polycarbonate, polyetherether ketone, polyamide, and a mixture of two or more of them in an amount of from 5 to 40 parts by weight per 100 parts by weight of Component (A), and (C) particles of a diaminodiphenylsulfone compound whose cross linking reactivity with the epoxy resin is prevented until the resin composition is subjected to molding or curing by a resin coating which is formed (i) by forming or adhering resin particles onto the surface of the diaminodiphenylsulfone particles or (ii) by forming a resin film on the diaminodiphenylsulfone particles, the coating resin used for forming the resin coating is not compatible with components included in the resin composition at a temperature up to the curing temperature of the resin composition, wherein the coating resin is a polyamide or a cured melamineformaldehyde resin, wherein the diaminodiphenylsulfone compound is used in an epoxy equivalent/amine, equivalent ratio of 1/(0.6 to 1.3), and wherein the amount of the coating resin is from 5 to 20% by weight based on the weight of the diaminodiphenylsulfone compound.

11. The method for production of a resin composition as claimed in claim 10, wherein a fiber reinforcement is impregnated with a mixture of components (A), (B) and (C) by a hot-melt method.

12. The method for production of a resin composition as claimed in claim 11, wherein the mixture is in a form of a film and the impregnation is conducted by hot-pressing.

* * * * *